Patented Oct. 9, 1928.

1,686,785

UNITED STATES PATENT OFFICE.

ISAIAH N. ZELLER, OF NEW YORK, N. Y.

FOOD PRODUCT AND PROCESS OF PREPARING THE SAME.

No Drawing. Application filed April 18, 1919, Serial No. 291,103. Renewed April 23, 1927.

My invention relates to improvement in food products, and particularly to the process of preparing the same, and has for its object the provision of means whereby various fruits may be preserved in a compactly pressed form.

Another object is the provision of a process whereby various fruits may be reduced to a flake form and preserved in this state.

Other objects will appear hereinafter.

In carrying out my invention, pulpous fruits are partially dried and are then cut into small pieces or flakes. After having been reduced to small pieces or flakes, these fruits are again dried so as to be thoroughly dehydrated. This drying process may be performed by means of the sun or by some artificial means.

When the fruits are reduced to a flake form, after having been thoroughly dried in this form, the same are coated, by dipping or some other suitable means, with a sugar coating. The material of which this coating consists may be some suitably flavored syrup, a saccharine solution, chocolate or the like. After the flakes have been coated as described, they are then thoroughly dried so as to assume a state of crispness. The fruit prepared in this manner is then ready to be served, the same being used in a manner similar to the manner in which the ordinary toasted corn flakes are used. The coating of the flakes, after the same have been thoroughly dried, may be dispensed with, thereby allowing the crisp fruit flakes to retain their natural flavor.

If it is desired, the dried fruit may be cut into small pieces, as well as into flakes, and the fruit in this state then mixed thoroughly with some binding material, such as a suitable syrup. This fruit, of course, previous to being mixed with the syrup is thoroughly dehydrated by any selected means, as already mentioned. A suitable amount of sweetening material is contained in the syrup, to which may also be added, although this is discretionary, a suitable amount of some sort of flavoring material, such as peppermint, pepsin, etc. While the fruit is being thoroughly mixed in the binding material, this syrup or other binding material which may be used, is maintained in a warm state by any suitable means. After having been thoroughly mixed the mixture is then poured into suitable presses which are used to express the liquid portion from said mixture. By putting the mixture through sufficient pressure, the liquid portion may be completely expressed therefrom, and the mixed, sweetened and flavored fruit which remains may be compactly pressed into a solid mass. This mass may then be cut into cubes, or, in the course of the present process, rolled into thin sheets. These sheets may then be cut into strips or short sticks. These cubes or sticks are then dried thoroughly and sprinkled with some sweetening powder and wrapped in oil paper, as is done at the present time with the ordinary chewing gum.

Instead of mixing the fruit with syrup, some fruits which are more pulpous may be used instead, as figs, raisins, etc. When no flavoring material is added to the mixture, the fruit, of course, will retain its natural flavor.

There is thus provided a product which forms a suitable substitute for cereals and also for chewing gum and the like, the compact pressing of the fruit giving it the necessary cohesive qualities to prolong mastication. Fruit treated in this manner affords an article which is palatable, digestible and nourishing, and also an article which will serve as a laxative owing to the acidity of the materials which are used.

Another beneficial feature may be added to the product, when the same is rolled into sticks or pressed into cubes, by the addition of a suitable dentifrice which may be mixed with the syrup with which the fruit is to be mixed.

While I have illustrated and described the preferred process for carrying my invention into effect, this is capable of variation and modification, without departing from the spirit of the invention. I, therefore, do not wish to be limited to the precise details of process set forth, but desire to avail myself of such variations and modifications as come within the scope of the appended claims.

Having then fully described my invention what I claim as new and desire to secure by Letters Patent is:—

1. A food product consisting of dried fruit reduced to flakes and compactly pressed together.

2. A food product consisting of sweetened dried fruit reduced to flakes and compactly pressed together.

3. A food product consisting of dried pulpous-fruits reduced to flakes, and dried again.

4. The process of preparing flakes of dried fruit which consists in drying pulpous fruits, reducing the dried fruits to flakes, and then drying the flakes.

5. The process of preparing a preserved fruit food product which consists in drying pulpous fruits, reducing the dried fruits to flakes, drying the flakes to seal the fresh surfaces, mixing the dried flakes with a saccharine solution, compactly pressing the mixture, and drying the compacted product.

6. The process of preparing a preserved fruit food product which consists in drying pulpous fruits, reducing the dried fruits to flakes, drying the flakes to seal the fresh surfaces, compactly pressing the flakes together, and drying the compacted product.

7. The herein described method which consists in flaking dried uncooked fruit, pressing the flakes into a solid mass, dividing the mass into pieces, rolling the pieces into sheets, cutting the sheets into strips, and drying the strips to close the pores opened by the operation of dividing into pieces.

8. The herein described method which consists in flaking dried uncooked fruit, mixing the flakes with a liquid binder, pressing the mixture to express excess liquid and to reduce the mixture to a solid mass, dividing the mass into pieces, and drying the pieces to close the pores opened by the operation of dividing into pieces.

9. A food product consisting of dried fruits reduced to flakes which are dried again and compactly pressed together.

In testimony whereof I have signed my name to this specification.

ISAIAH N. ZELLER.